United States Patent
Bruckstein et al.

(10) Patent No.: US 6,757,407 B2
(45) Date of Patent: Jun. 29, 2004

(54) TRANSFORM DOMAIN IMAGE WATERMARKING METHOD AND SYSTEM

(75) Inventors: Alfred M. Bruckstein, Summit, NJ (US); Thomas J. Richardson, South Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 102 days.

(21) Appl. No.: 10/037,743

(22) Filed: Nov. 9, 2001

(65) Prior Publication Data

US 2002/0164048 A1 Nov. 7, 2002

Related U.S. Application Data

(63) Continuation of application No. 09/076,284, filed on May 12, 1998.

(51) Int. Cl.[7] .............................................. G06K 9/00
(52) U.S. Cl. ..................... 382/100; 382/232; 380/54; 713/176
(58) Field of Search ................. 382/100, 232, 382/183, 240, 233; 713/150, 176, 179; 348/403.1; 380/54, 210; 358/405, 3.28; 235/494

(56) References Cited

U.S. PATENT DOCUMENTS

| | | | |
|---|---|---|---|
| 5,530,755 A | 6/1996 | Pailles et al. | 380/18 |
| 5,530,759 A | 6/1996 | Braudaway et al. | 380/54 |
| 5,636,292 A | 6/1997 | Rhoads | 382/232 |
| 5,646,997 A | 7/1997 | Barton | 380/23 |
| 5,710,834 A | 1/1998 | Rhoads | 382/232 |
| 5,745,604 A | 4/1998 | Rhoads | 382/232 |
| 5,748,783 A | 5/1998 | Rhoads | 382/232 |
| 5,912,972 A | 6/1999 | Barton | 380/23 |
| 5,915,027 A * | 6/1999 | Cox et al. | 380/54 |
| 5,949,885 A | 9/1999 | Leighton | 380/54 |
| 5,960,081 A | 9/1999 | Vynne et al. | 380/10 |
| 6,037,984 A * | 3/2000 | Isnardi et al. | 375/240.21 |
| 6,047,374 A * | 4/2000 | Barton | 713/150 |
| 6,360,000 B1 * | 3/2002 | Collier | 382/100 |
| 6,424,725 B1 * | 7/2002 | Rhoads et al. | 382/100 |
| 6,535,617 B1 * | 3/2003 | Hannigan et al. | 382/100 |
| 2002/0009208 A1 * | 1/2002 | Alattar et al. | 382/100 |
| 2003/0039377 A1 * | 2/2003 | Rhoads et al. | 382/100 |

FOREIGN PATENT DOCUMENTS

EP 0 766 468 A2 4/1997

OTHER PUBLICATIONS

XP–002168702 Sep. 11, 1997 Abstract Only.

(List continued on next page.)

*Primary Examiner*—Jayanti K. Patel
*Assistant Examiner*—Barry Choobin

(57) ABSTRACT

A method and system for watermarking and recovering a watermarked digitized image for subsequent authentication. The digitized image comprises spatial domain data signals reproduced from an original image. A transformer transforms the spatial domain data signals into frequency domain data signals, including respective magnitude and phase data signal components. Information is embedded into the magnitude data signals to develop modified data signals and the modified data signals are converted from the frequency domain to the spatial domain to generate the watermarked digitized image. For recovery, a second transformer transforms the spatial domain data signals comprising the respective original digitized image and watermarked digitized image into respective frequency domain dataset signals. A comparator responsive to the two transformer outputs compares the respective frequency domain dataset signals to identify the watermark and verify the authenticity of the image reproduction.

34 Claims, 26 Drawing Sheets

OTHER PUBLICATIONS

F.M. Boland, J.J.K. Ó Ruanaidh, and C. Dautzenberg, "Watermarking Digital Images," Department of Electronic and Electrical Engineering, Trinity College dublin, Ireland, published 1994.

F.M. Boland, J.J.K. Ó Ruanaidh and C. Dautzenberg, "Watermarking Digital Images for Copyright Protection," Trinity College Dublin, Ireland, published 1994.

Ingemar J. Cox, Joe Kilian, Tom Leighton and Talal Shamoon, "Secure Spread Spectrum Watermarking for Multimedia," NEC Research Institute, Technical Report 95–10, submitted o IEEE Trans. On Image Processingm, published Oct. 1995.

Germano Caronni, "Assuring Ownership Rights for Digital Images," Computer Engineering and Networks Laboratory, Swiss Federal Institute of Technology Zurich, published Jun. 14, 1994.

* cited by examiner

TRANSFORM DOMAIN IMAGE WATERMARKING METHOD AND SYSTEM

This is a continuation of application Ser. No. 09/076,284, filed May 12, 1998. Each of these prior applications is hereby incorporated herein by reference, in its entirety.

FIELD OF THE INVENTION

The invention relates to digital image watermarking methods and systems and more particularly a method and apparatus for watermarking digital images and authenticating watermarked digital images in the frequency domain.

BACKGROUND OF THE INVENTION

The popularity and proliferation of digitized images has resulted in a dramatic increase in image distribution over vast areas. Digitized images comprise formatted digital data conveniently storable in digital form with mass memories, floppy diskettes, or in hard copy form as an image printout. Much of the distribution of digitized images relies upon digital networks such as Local Area Networks (LANs) and the Internet which enable swift and relatively unchecked uploading and downloading of image data between computer systems over vast transmission paths. While legitimate widespread dissemination of a protectable digital image typically benefits the image owner, illegitimate and unauthorized reproduction and distribution often damages the proprietary value of the image.

To combat the problem of illicit reproduction and dissemination of protected digitized images, a number of methods and devices for embedding detectable tags or "watermarks" into such images have been devised to track unauthorized secondary distribution. One method, disclosed by Larry O'Gorman to the inventors proposes embedding watermarks in the spatial domain of the image data by slightly enhancing or depressing the image grey levels. Although this method works well for its intended purposes, the watermark is substantially non-holographic in that it becomes degraded and in some instances undetectable under circumstances where the image is cropped or compressed by a suitable compression algorithm.

A second proposal by Cox et. al. allegedly addresses the above shortcomings by watermarking the image data in the frequency domain. The procedure involves randomly choosing a set of unique frequency components to encode a pseudo-random (noise-like) watermark vector. The watermark may then be later recovered or detected by a correlation procedure. The frequency components chosen are perceptibly significant, residing in the low frequency range, to ensure that the relevant information will not be lost due to cropping or compression.

While the Cox proposal appears beneficial for its designed applications, the pseudo-random noise-like watermark is incapable of directly carrying the watermarking information. Moreover, in order to detect or recover the watermark, a correlation search must be carried out in order to compare the data to all other watermarks. This presents a somewhat complicated and calculation heavy method, requiring substantial computing resources.

Therefore, a need exists for a method and system for watermarking and authenticating a watermarked image such that the watermark is capable of surviving cropping and compression of the image data. Moreover, the need exists for such a method and system to provide a watermark capable of directly carrying the bits of watermarking information. Additionally, the need exists for such a system and method to provide watermark recovery through straightforward procedures. The method and apparatus of the present invention satisfies these needs.

SUMMARY OF THE INVENTION

Image authentication according to the present invention is effected by using watermarks that are imperceptible and have the ability to directly carry information. The watermarks are distinguishable from one or more differently tagged copies of the image and are easily recovered from a tagged image and the original image. As a durable security feature, attempts to remove the watermarks have noticeable ill-effects on the image. Additionally, image modification and compression algorithms have a relatively minor effect on the tags. Also important is the image cropping survival capability realized through distribution of the watermark in the image plane.

To realize the above features and advantages, the present invention, in one form, comprises a method of robust digital image watermarking for embedding a predetermined bit sequence into a digital image. The method includes the steps of transforming the digital image into frequency domain data signals, including respective magnitude and phase data signal components. The next step involves determining a set of contiguous region(s) in the frequency domain and then embedding the predetermined bit sequence directly into the image frequency domain data signals by mapping bits to well-defined regions in the frequency domain.

In yet another form, the present invention includes a method of recovering a watermark from a tagged digitized image comprising a reproduction of an original image. The respective images comprise spatial domain datasets. The method includes the steps of first transforming the spatial domain data comprising the respective images into respective frequency domain datasets, then comparing the respective frequency domain datasets to identify the watermark and verify the authenticity of the image reproduction.

A further form of the invention comprises a watermark recovery apparatus for authenticating a tagged digitized image comprising a reproduction of an original image. The respective images comprise spatial domain datasets. The apparatus includes a transformer for transforming the spatial domain data comprising the respective images into respective frequency domain datasets; and a comparator responsive to the transformer for comparing the respective frequency domain datasets to identify the watermark and verify the authenticity of the image reproduction.

Yet another form of the invention comprises a digitized image authentication system for implanting and detecting watermark information in a digitized image. The digitized image comprises spatial domain data and is reproduced from an original image. The system includes a watermarking apparatus for tagging the digitized image. The apparatus includes a transformer for transforming the spatial domain data into frequency domain data, including respective magnitude and phase data components. A processor is disposed at the output of the transformer and is operative to embed information into the magnitude data to develop modified data. A converter responsive to the processor converts the modified data from the frequency domain to the spatial domain to generate the watermarked digitized image. The system further includes a watermark recovery apparatus for authenticating the tagged digitized image. The recovery apparatus includes a transformer for transforming the spatial domain data comprising the respective images into respective frequency domain datasets. A comparator is responsive to the transformer for comparing the respective frequency domain datasets to identify the watermark and verify the authenticity of the image reproduction.

BRIEF DESCRIPTION OF THE DRAWINGS

Other features and advantages of the present invention will be apparent from the following detailed description when read in conjunction with the accompanying drawings, wherein.

DETAILED DESCRIPTION OF THE INVENTION

The present invention provides digital image watermarks that are designed to be robust under all image modifications or degradations. We have observed that many image modifications or degradations that digital images may experience may be modeled as combinations of intensity shift, linear filtering, and additive noise. In the frequency domain, in particular, the approximations involve modeling the modifications or degradations as an unknown change to the d.c. component, multiplication by a smooth mask, and additive noise.

A solution for ensuring the protection of digital images according to the present invention involves modifying an original digitized image I(i,j) to produce another image $I^W$(i,j) that will include embedded information on the image source and its legal user. The amount of information in the watermark is in the range between 30 to 100 bits, with the following conditions applicable:

1. The tags/watermarks are imperceptible, i.e., $I^W$ appear very similar to the original images I;
2. Tags have the capability to carry sufficient information;
3. Tags are not easily identifiable from one or more differently tagged copies of the image;
4. Tags are easily recoverable from a tagged image and the original;
5. Attempts to remove the tags or tamper with them have noticeable ill-effects on the image;
6. Tags cannot be wiped out by image modification/ compression algorithms or by other casual image processing procedures;
7. Tags are distributed in the image plane and are recoverable from "arbitrary" portions of the image (i.e. they survive image cropping).

Watermark Authentication System

Figure 1:
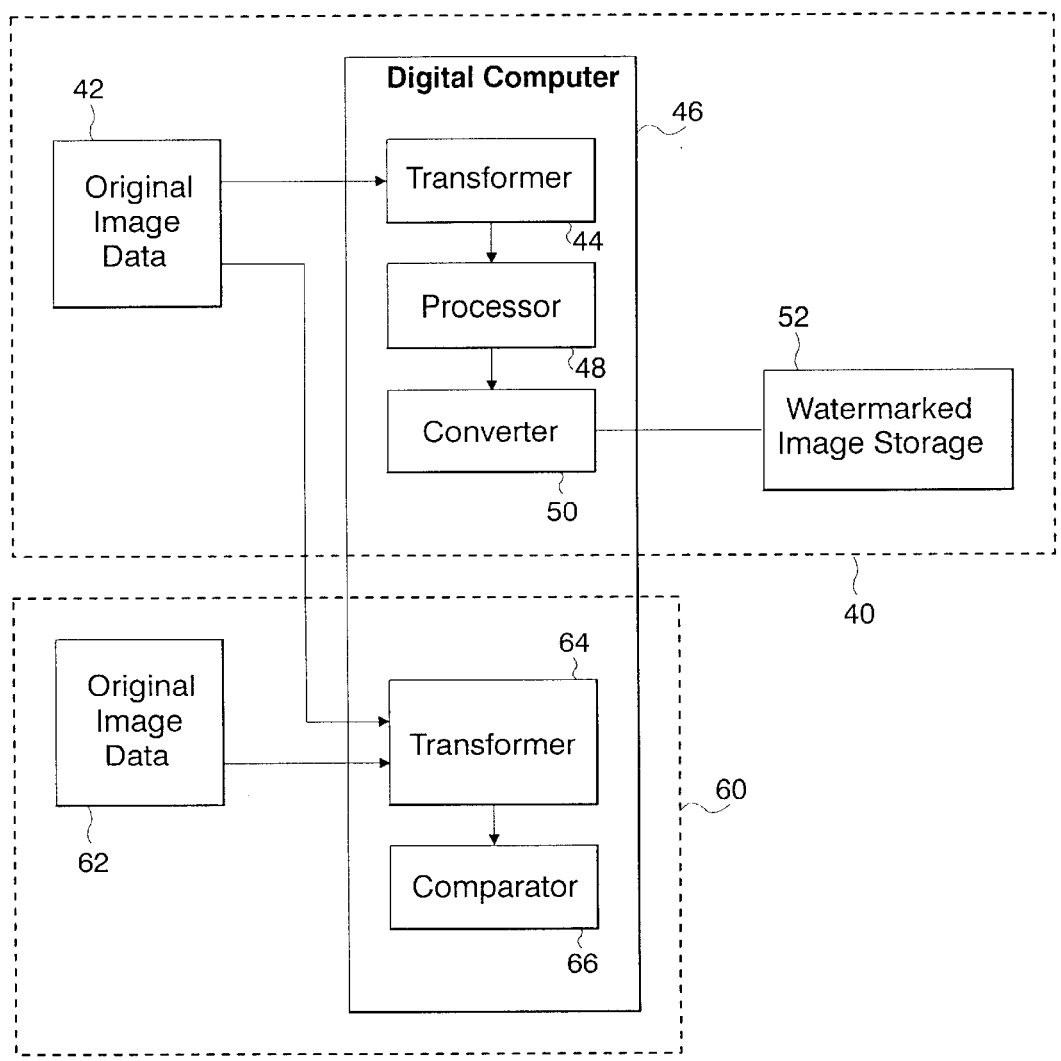
FIG. 1 is a block diagram of a digital image authentication system according to one embodiment of the present invention.

Referring now to FIG. 1, and in accordance with one embodiment of the present invention, a watermark authentication system, satisfying the criteria above and generally designated 30, includes a watermarking apparatus 40 for embedding a watermark into the frequency domain of a given image dataset and a watermark recovery apparatus 60 for authenticating the presence of an embedded watermark.

The watermarking apparatus 40 includes a data storage device 42 for storing image data representing the "original" image dataset. The data storage device couples to a transformer 44 disposed in a digital computer 46 for transforming spatial domain data representing the "original image" into the frequency domain. A processor 48 is disposed at the output of the transformer to embed watermark information into the frequency domain data and generate modified frequency domain data pursuant to software implemented steps according to the watermarking method of the present invention. Responsive to the output of the processor is a converter 50 for changing the frequency domain data back to spatial domain data. The resultant image data may then be stored in a memory 52.

The watermark recovery apparatus 60 includes an image data acquisition device 62 such as a scanner or network interface for downloading a digital image into the computer 46. The data acquisition device feeds the spatial image data to a second transformer 64 for converting the spatial data into the frequency domain. The second transformer 64 also receives spatial data from the data storage device 42 representing the "original" image. A comparator 66 disposed downstream of the transformer compares the original image data to the acquired image data in the frequency domain to extract the watermark.

In operation, the watermark authentication system carries out steps according to the watermarking and watermark recovery methods of the present invention.

Watermarking Method

The method for watermarking, according to one embodiment of the present invention, generally includes introducing slight modifications of the image in some transform-domain image representation. For example, using the Fourier domain for tagging, an image I(x,y) is transformed to $\tilde{I}$(u,v) via the Fourier transform $$i\tilde{I}(u,v) = FT\{I(x,y)\} := \int\int I(x,y)e^{j2\pi(ux+vy)}dxdy$$

where $\tilde{I}$(u,v) is a complex bivariate function that can be represented by: $\tilde{I}(u,v) = M(u,v)e^{jP(u,v)}$ with $M(u,v) = |\tilde{I}(u,v)|$ the magnitude and $P(u,v) \in [0, 2\pi]$ the corresponding phase. Since $I(x,y)$ is real, $M(-u,-v)=M(u,v)$ and $P(u,v)=2\pi-P(-u,-v)$.

Generally, "phase" image modifications are visually more perceptible than magnitude/amplitude modifications. Thus, it is more advantageous to modify the magnitude components in order to ensure imperceptibility. Moreover, modifications to magnitude/amplitude components of frequency data are well tolerated, leading to images that appear very similar to the originals.

Figure 2:
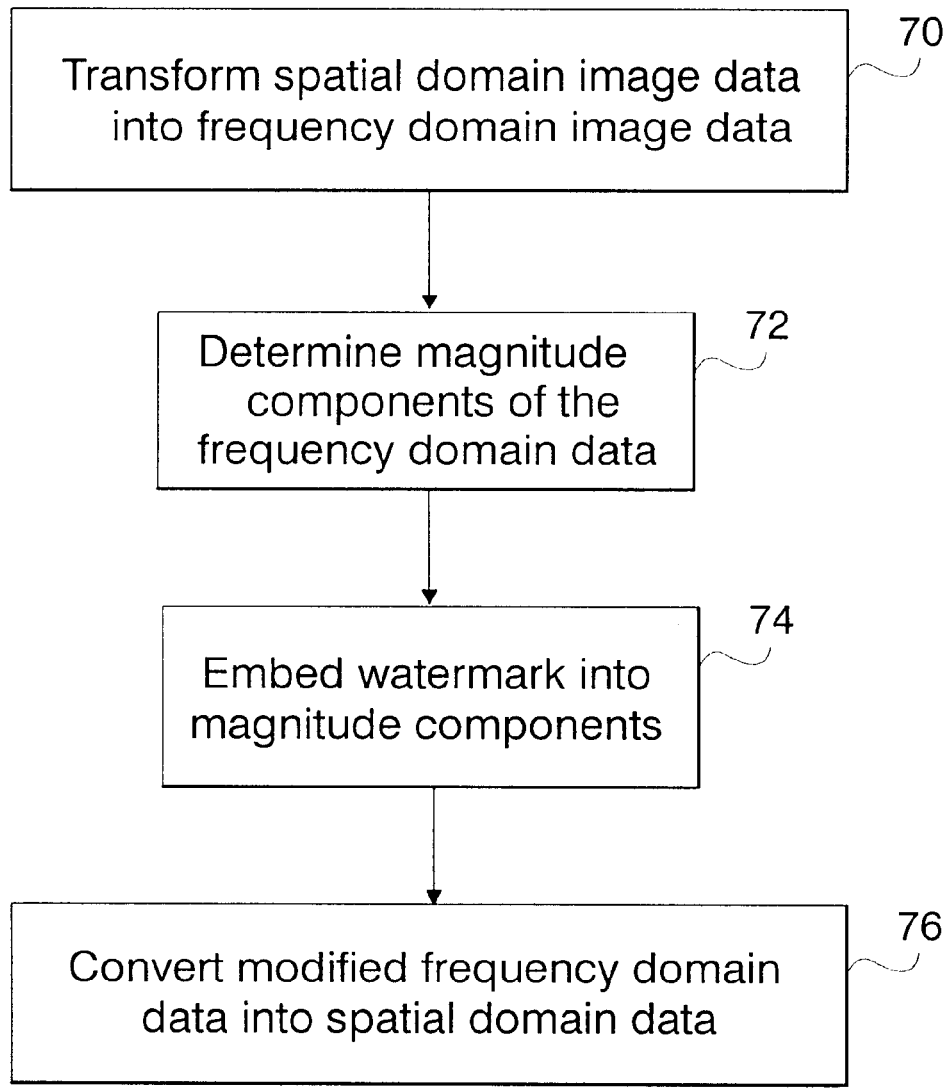
FIG. 2 is a graphical representation of a watermark mask according to one embodiment of the present invention.

Referring now to FIG. 2, the method of watermarking a digital image represented by $I(x,y)$ according to one embodiment involves first transforming the image data from the spatial domain to the frequency domain at step 70. This is preferably performed by loading a copy of the image data into the computer 46, such that the transformer 44 can operate pursuant to software to transform of the image data. The resulting frequency domain data comprises magnitude/amplitude and phase components.

The next step, at 72, includes determining the magnitude components of the frequency domain data and embedding a watermark into the magnitude image data $M(u,v)$, at step 74, thereby changing it to $MW(u,v)$. After the embedding step, the modified frequency domain data is converted, at step 76, into spatial domain data.

Embedding the watermark involves, for example, modifying the magnitude $M(u,v)$ by multiplying it with a "watermark mask" $W_M(u,v)$, or by adding to the data a "watermark mask" $W_A(u,v)$ according to the respective expressions:

$$M^{WM}(u,v)=W_m(u,v) \cdot M(u,v)$$

$$M^{WA}(u,v)=W_A(u,v)+M(u,v)$$

In the first case, $W_M(u,v)$ is "close" to 1 everywhere, i.e., $W_M(u,v)=1+\epsilon_M(u,v)$, and $\epsilon_M(u,v)$ will be a function of the information bits $\{b_1, b_2, \ldots b_N\}$ to be hidden into the watermark. In the second case, $W_A(u,v)$ itself is small for all $(u,v)$ in order not to visibly perturb the watermarked images.

In the first case, that of multiplicative mask watermarking, the following expression holds true:

$$I^W(x,y)=FT^{-1}\{M(u,v)e^{iP(u,v)}+\epsilon_M(u,v)M(u,v)e^{iP(u,v)}\}=I(x,y)+I(x,y)*FT^{-1}\{\epsilon_M(u,v)\}$$

In both the multiplicative mask marking and additive mask marking cases, in order to keep $I^W(x,y)$ real, we require $\epsilon_{M/A}(u,v)=\epsilon_{M/A}(-u,-v)$. For simplicity, only the multiplicative case will be described further, it being understood that through disclosure of the multiplicative watermarking method, those skilled in the art will also have the necessary tools to implement the additive method.

Figure 3:
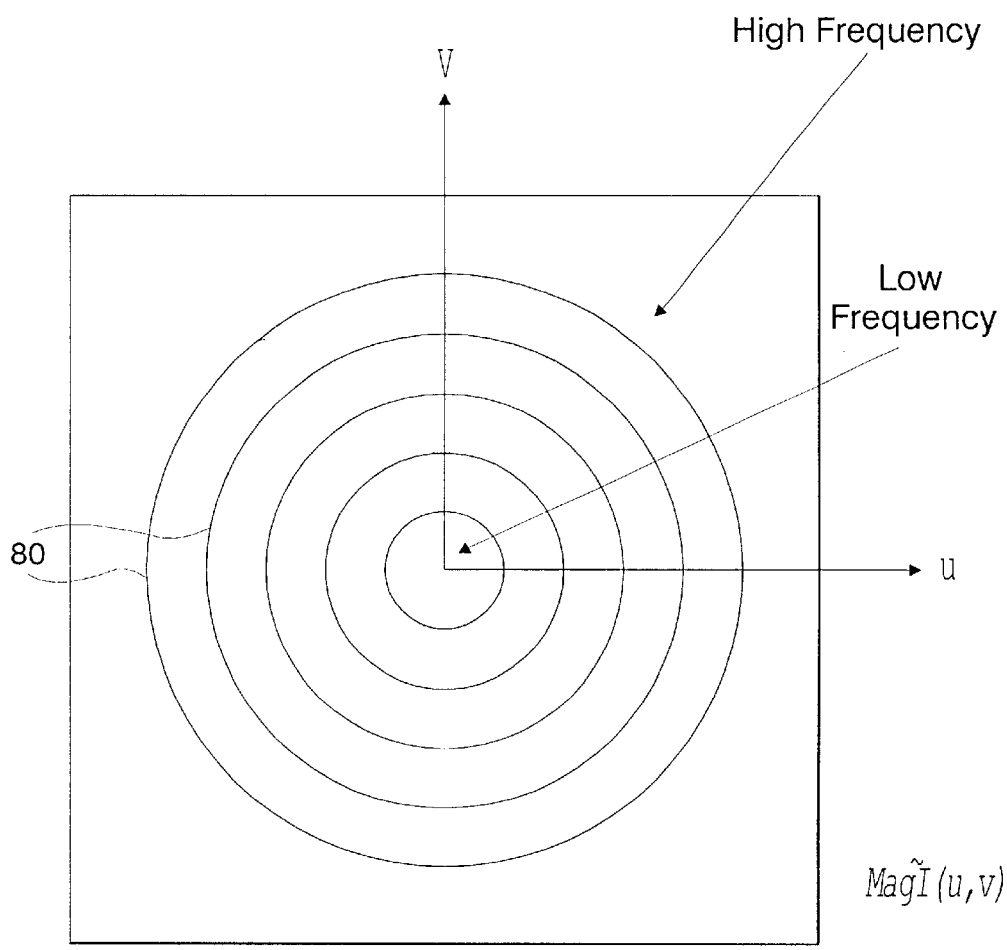
FIG. 3 is a block diagram illustrating steps involved in the watermarking method of the present invention.

Referring now to FIG. 3, considering piecewise constant functions $\epsilon_M(u,v)$, which take values $0, \pm\epsilon$, the information bits $b_1, b_2 \ldots, b_N$ may modulate a sequence of concentric rings 80 in the frequency domain, as follows:

$$W_M(u,v)=1+\epsilon(-1)^b \text{ for } \sqrt{u^2+v^2} \in [r_i, r_{i+1})$$

This method assigns the value $(1+\epsilon)$ if $b_i=0$ and the value $(1-\epsilon)$ if $b_i=1$ to the mask over a ring of spatial frequencies located between the radii $r_i$ and $r_{i+1}$. As shown in FIG. 3, high frequency components reside in the outer rings while low frequency components lie in the inner rings. Here the parameters $\epsilon, r_1, r_2 \ldots, r_N$ are to be chosen so as to achieve imperceptibility, requiring small $\epsilon$'s, and good survival under various image modifications, requiring placing $r_1, \ldots, r_N$ into the lower frequencies. The constant $\epsilon$ could be replaced with a variable sequence of gains adapted to the frequency domain rings they modulate.

Figure 4:
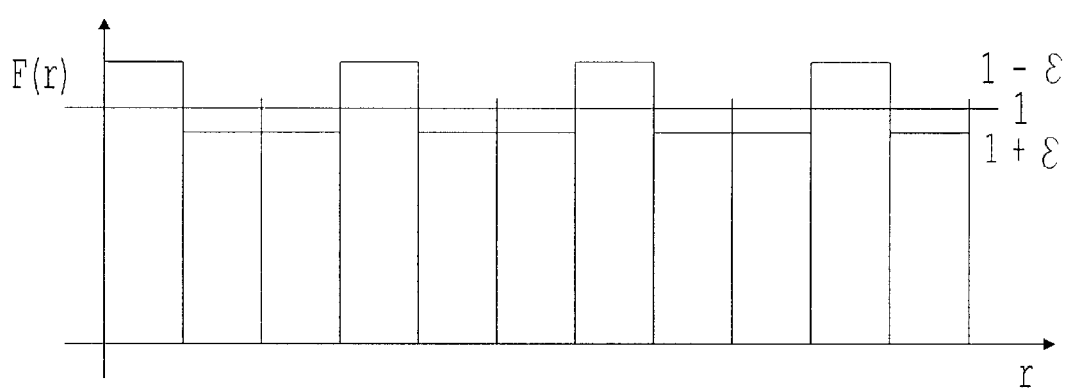
FIG. 4 is a graphical depiction of a watermark pattern according to one embodiment of the present invention.

Many other options for the design of mask functions are available. FIG. 4 illustrates one such mask design possibility. One could embed a variety of geometric designs or even a company logo into $W(u,v)$. Such designs could be of use when the purpose of the watermark is only to imperceptibly identify the source of the image. If explicit bits must be encoded in $W(u,v)$, for example, to identify the recipient of the image, the encoding may be performed with gain sequences combined with a variety of geometric shapes.

To explain how the watermark survives degradation of the images, we will consider models of the degradation. Suppose a watermarked image $I^W(x,y)$ is generated and then subjected to a linear transformation that adds noise as follows:

$$I_D^W(x,y)=A(x,y)*I^W(x,y)+B+N(x,y)$$

where B is a constant, $N(x,y)$ is a zero mean noise image, $\tilde{A}(x,y)$ is a smooth function, and * denotes a convolution. Then $$\tilde{I}_D^W(u,v)=i\tilde{A}\tilde{I}(u,v) \cdot \tilde{I}^W(u,v)+B\delta(u,v)+\tilde{N}(u,v)$$

$$=i\tilde{A}\tilde{I}(u,v)[1+\epsilon_M(u,v)]\tilde{i}\tilde{I}(u,v)+B\delta(u,v)+i\tilde{N}\tilde{I}(u,v)$$

The constant B renders the DC component effectively unrecoverable. Hence if the assumption is made that $B \not= 0$, then the watermark information should not be embedded in the DC component (i.e., we should have $\epsilon_M(0,0)=0$). One may reasonably assume the function $\tilde{A}(u,v)$ to be smooth since non-smooth effects may be absorbed into $\tilde{N}(u,v)$.

Many image transformations which are not necessarily linear filtering processes can, for the purposes of the present invention, nevertheless be reasonably well modeled as such. Examples include printing, photocopying and lossy compression.

It should be expected that the watermarked image will be subject to cropping. Suppose the original and watermarked image are supported on a $[0,1] \times [0,1]$ matrix. Cropping the image corresponds to multiplying $I(x,y)$ by $\text{Rect}(c_x(x-x_0), c_y(y-y_0))$ where $\text{Rect}(x,y)=1_{[0,1] \times [0,1]}$. Then $$FT(\text{Rect}(x,y))=e^{-i\pi(u+v)}\sin c\pi u \sin c\pi v$$

hence $$FT(I(x,y)\text{Rect}(c_x(x-x_0), c_y(y-y_0))) =$$

$$\frac{1}{c_x c_y}\tilde{I}(u,v) \otimes e^{-i2\pi(c_x x_0+c_y y_0)}e^{-i\pi\left(\frac{u}{c_x}+\frac{v}{c_y}\right)}\text{sinc}\frac{\pi u}{c_x}\text{sinc}\frac{\pi v}{c_y}$$

Thus, the effect of cropping on the Fourier transform is to convolve it with a complex smoothing function. To the extent that the constant regions of the watermark are large compared to the main peak of the sinc function, the watermark will survive, i.e., $$(1+\varepsilon(u,v))\tilde{I}(u,v) \otimes \frac{e^{-i2\pi(c_x x_0+c_y y_0)}}{c_x c_y}e^{-i\pi\left(\frac{u}{c_x}+\frac{v}{c_y}\right)}\text{sinc}\frac{\pi u}{c_x}\text{sinc}\frac{\pi v}{c_y} \approx$$

$$(1+\varepsilon(u,v))\left[\tilde{I}(u,v) \otimes \frac{e^{-i2\pi(c_x x_0+c_y y_0)}}{c_x c_y}e^{-i\pi\left(\frac{u}{c_x}+\frac{v}{c_y}\right)}\text{sinc}\frac{\pi u}{c_x}\text{sinc}\frac{\pi v}{c_y}\right]$$

for those $u,v$ where $\epsilon(u,v)$ is locally constant on a scale comparable to $c_x \times c_y$. This approximate equality will not hold near the boundaries where the function $\epsilon(u,v)$ changes discontinuously. Thus, the watermark is largely expected to survive cropping if the regions over which $\epsilon(u,v)$ is constant are sufficiently large. Of course, when the attempt to recover the watermark is made, one must compare against an identical cropping of the original image.

The watermark may also be subjected to lossy compression. Lossy compression of $I(x,y)$ involves replacing $I(x,y)$ with a version $I^{cp}(x,y)$ that requires fewer bits to encode than $I(x,y)$, but is nonetheless similar to it in some subjective/objective distance measure. It is difficult to evaluate the influence of various compression algorithms. However, we can state, in general, that it will involve filtering out visually "imperceptible" frequency components of $I(x,y)$. When embedding a watermark into the image, these general facts must be given careful consideration. We can model the compression effects as a combination of linear filtering and additive noise: a model we have already discussed. In fact, when we compare a JPEG-compressed image to its original version, we realize that the model of a multiplicative mask in the frequency domain is quite reasonable.

When implementing a watermarking procedure, one must keep in mind that, given some reasonable economical/financial motivations, there will be serious and professionally well informed attempts to tamper and modify and/or remove the tags embedded in images. It may be assumed that there will be legal arrangements in place, requiring each copyrighted document to have a legible watermark embedded in it. Illegal users will most likely modify, not remove, the existing watermarks. One attempting to disturb the watermark embedded by the method of the present invention would have to first multiply the fourier transform of the image by a random pattern $W_{rand}(u,v)$. This would generate an image with a watermark of $W_M(u,v) \cdot W_{rand}(u,v)$ from which it would likely not be possible in general to recover $W_M(u,v)$. However, this would yield a legally unusable image since it will lack a valid watermark. In order to illegitimately generate a watermark that would survive, one would have to know the geometry of the watermarks and multiply the transformed image by a $W_{attack}(u,v)$ that is adapted to the frequency domain geometry of the watermarks.

Watermarked images are also subject to so-called "collusion attacks", in which several watermarked images are used to learn about the watermarks and subsequently modify them. Indeed, if one has two watermarked images one could, assuming identical geometry, approximately recover various ratios, for example:

$$\frac{W_{M_i}(u,v)}{W_{M_j}(u,v)}$$

that would lead to knowledge about the watermark geometry. Therefore, part of the security in the watermarking process proposed must also come from freedom to parameterize the geometry of the spectral masks employed.

Within the context of watermarking in the fourier transform domain there are essentially two strategies which can be used to enable the watermark to survive various expected image transformations. These include:

A. Embedding a watermark in such a way that its recovery is not affected by the transformations; and B. Attempting to identify or model the transformation so as to compensate for it prior to watermark recovery.

In the case of cropping, for example, approach B seems to be required in any case. One must precisely locate the cropped portion in the original image. This may be a non-trivial task if the image has also been resampled.

Approach A has been primarily considered herein with regard to linear filtering. The intention of the present invention, in general, is to guard against a spatially smooth scaling of the Fourier transform and additive noise.

A potentially effective B type strategy includes leaving various regions of the frequency domain unaltered, i.e., setting $\epsilon(u,v)=0$ there. Given a modified watermarked image, the spectral modification in the unmarked regions may be sampled and appropriately interpolated to obtain estimates of the modifications in the marked regions. These estimates may be used to approximately invert or model the modifications in the watermarked regions. It may then be possible to use much less geometric redundancy in the watermark and much more error correcting coding.

Watermark Recovery Method

The key to the optimal watermark recovery method of the present invention includes the following general considerations from estimation/detection theory. Suppose a set of complex numbers is reported by $\{s_i\}i=1,2, \ldots k$ and a set of observations $q_i$ is expressible as:

$$q_i = \alpha s_i + n_i$$

where $\alpha$ is a real value and $n_i$ are independent realizations of a complex noise random variable.

In this setting, the following questions can be addressed:

1. What is the optimal estimator of $\alpha$ given $\{q_i\}i=1,2, \ldots k$; or
2. If $\alpha=1+\epsilon$ or $\alpha=1-\epsilon$, what is the optimal decision on whether $a$ is higher or lower than 1?

It should be assumed that $n_i$ are independent complex Gaussian random variables with mean 0, and variance $2\sigma^2$. To answer the first question posed above, one can write $p(Q|\alpha)$ the likelihood of seeing the data given some value of $\alpha$, and maximize this with respect to $\alpha$ in order to obtain the maximum likelihood ML estimate of $\alpha$. Accordingly:

$$p(Q \mid \alpha) = \prod_{i=1}^{K} \frac{1}{2\pi\sigma^2} e^{-\frac{1}{2\sigma^2}|q_i - \alpha s_i|^2}$$

and here $p(Q|\alpha)$ is maximized if $$P(\alpha) := \prod_{i=1}^{K} |q_i - \alpha s_i|^2$$

is minimized. Hence, the optimal estimator for $\alpha$ is $$\alpha_{opt(ML)} = \frac{\sum_i \text{Re}(q_i^* s_i)}{\sum_i s_i^* s_i}$$

where s* denotes the complex conjugate of s. In the second case, one must deal with a hypothesis testing problem. If it is assumed that the $\alpha_+ = 1+\epsilon$ and the $\alpha = 1-\epsilon$ cases have equal prior probabilities, then the optimal hypothesis testing decision process proceeds via the following likelihood ratio test:

$$\lambda(Q) = \frac{P(Q|\alpha_+)}{P(Q|\alpha_-)} = \frac{P(Q|1+\epsilon)}{P(Q|1-\epsilon)}$$

This yields $$\frac{\prod_{i=1}^{k} e^{-\frac{1}{2\sigma^2}|q_i-\alpha_+ s_i|^2}}{\prod_{i=1}^{k} e^{-\frac{1}{2\sigma^2}|q_i-\alpha_- s_i|^2}} \begin{array}{c}\alpha_+ \\ > \\ < \\ \alpha_-\end{array} 1$$

which, by taking logs, is seen to be equivalent to $$\sum |q_i - \alpha_+ s_i|^2 \begin{array}{c}\alpha_- \\ > \\ < \\ \alpha_+\end{array} \sum |q_i - \alpha_- s_i|^2$$

This result reduces to $$\frac{\sum_i \text{Re}(q_i^* s_i)}{\sum_i |s_i|^2} \begin{array}{c}\alpha_+ \\ > \\ < \\ \alpha_-\end{array} \frac{\alpha_+ + \alpha_-}{2}$$

If $\alpha_+=1+\epsilon$ and $\alpha_-=1-\epsilon$, then the threshold is 1. The result illustrates that the optimal decision rule proceeds via $$\hat{\alpha}_{opt(ML)} \begin{array}{c}1+\epsilon \\ > \\ < \\ 1-\epsilon\end{array} 1$$

Hence, the following result may be stated: The optimal way to recover $\alpha$ from the $\{q_i\}$ measurements is by calculating $$\hat{\alpha} = \frac{\text{Re}\left(\sum_i q_i^* s_i\right)}{\sum_i s_i^* s_i}$$

and, if a priori it is known that $\alpha$ takes on some known values $\alpha_+$, $\alpha_-$, one has to compare $\alpha$ to the average value of $\alpha_+$ and $\alpha_-$.

This general result is implemented in the present invention in order to optimally detect/recover the watermark embedded in the image.

Figure 5:
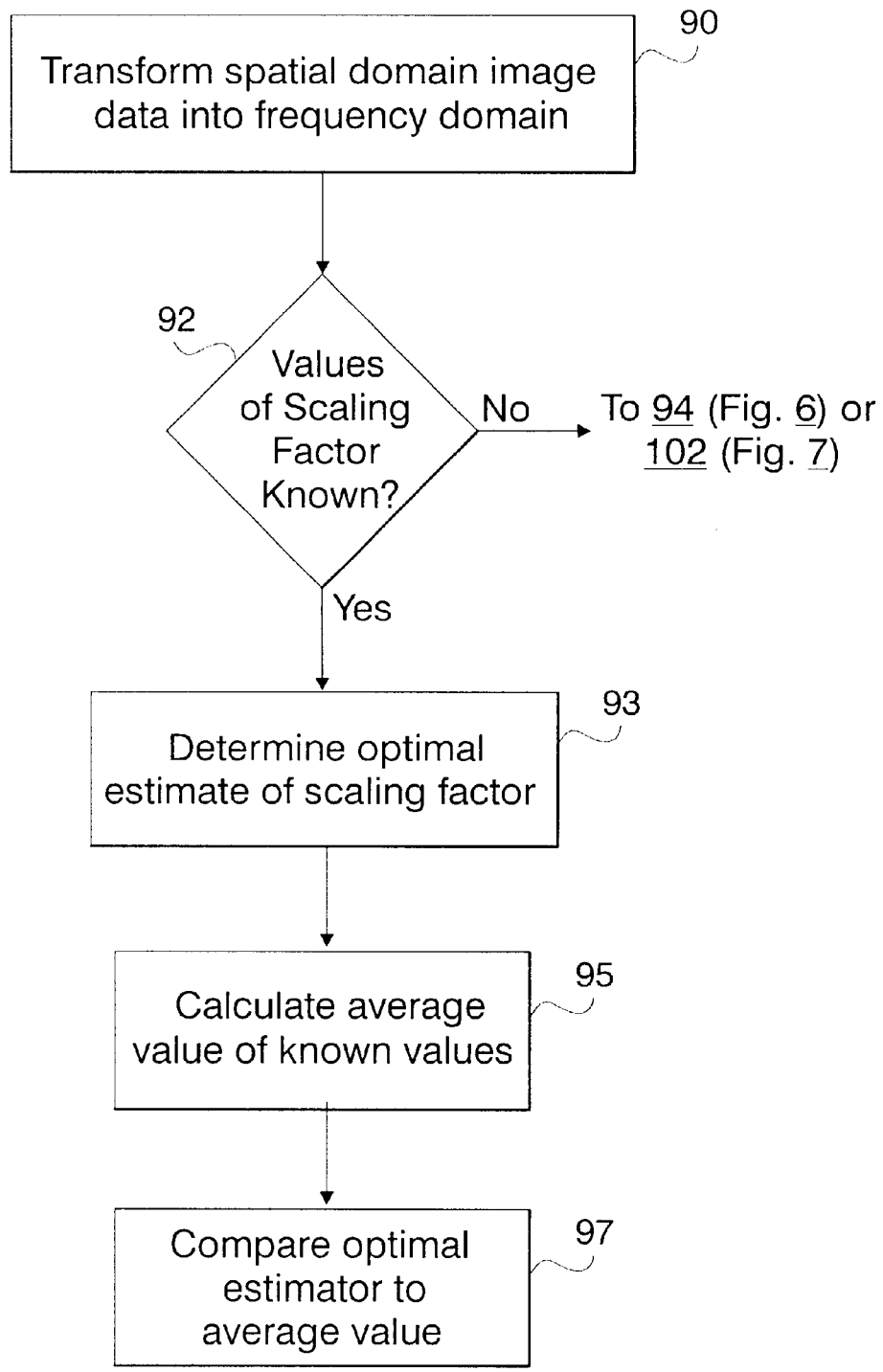
FIG. 5 is a block diagram illustrating steps implemented in one embodiment of the watermark recovery method of the present invention.

Referring now to FIG. 5, it shall be assumed as before that the process of embedding a watermark proceeds by first transforming spatial domain data into frequency domain data, at step 90, via multiplication of $\tilde{I}(u,v)$ by a mask $W_M(u,v)=1+\epsilon_M(u,v)$. The watermarked image $I^W(x,y)$ is first quantized to fit the way images are represented in the computer. Then the quantized image may undergo cropping, compression/decompression, some smoothing and dynamic range corrections and may be corrupted by some additive noise. The resulting quantized/corrupted $I^W(x,y)$ then becomes $\tilde{I}_w(u,v)$ in the frequency domain with each frequency component of $\tilde{I}_w(u,v)$ regarded as a complex observation of the corresponding spectral component of $\tilde{I}(u,v)$.

To apply the analysis considered above to the general linear filtering model, it is necessary that the multiplicative scaling of the spectrum $\tilde{A}(u,v)$ be approximately constant and known, at step 92. This may not be possible in general, requiring an extrapolation procedure, as shown in FIG. 6.

Figure 6:
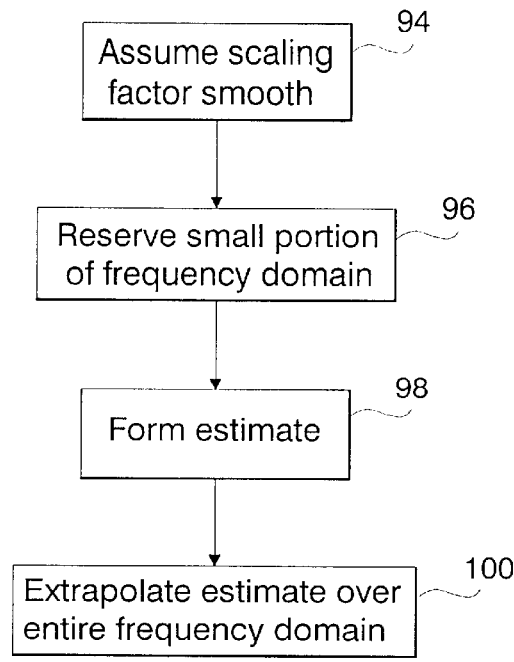
FIGS. 6–8 are block diagrams illustrating steps included in alternative embodiments of the watermark recovery method of the present invention.

Referring now to FIG. 6, assuming the unknown multiplicative scaling mask $\tilde{A}(u,v)$ is smooth, as in step 94, it would be feasible to estimate it by reserving a small, approximately uniformly distributed, portion of the frequency domain for estimation purposes at step 96. The spectrum would be unaltered there, i.e., we would have $\tilde{I}^W(u,v)=\tilde{I}(u,v)$ so that an estimate of $\tilde{A}(u,v)$ could be formed at step 98 and extrapolated over the entire frequency domain at step 100.

Figure 7:
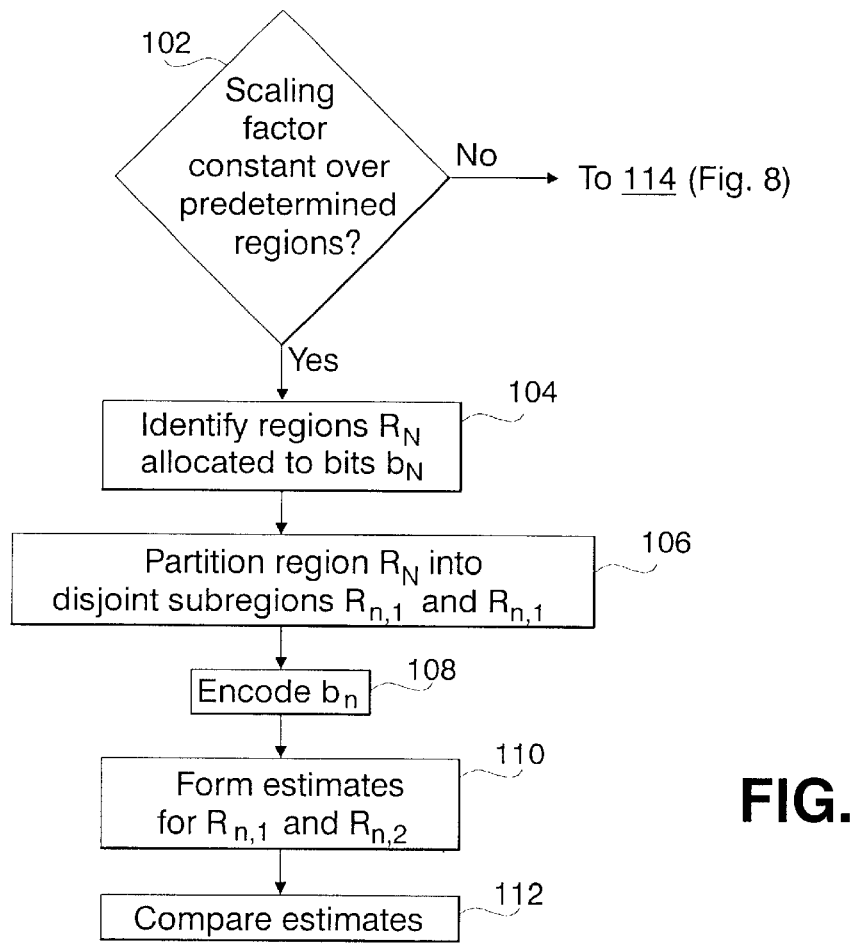

Alternatively, as shown in FIG. 7, the watermark data may be modulated so as to ameliorate the effects of smooth but unknown filtering. If, for example, it is known, a priori, that over the regions allocated to each bit in the watermark, the unknown filtering factor changes by only a very small amount, i.e., $\tilde{A}(u,v)=\beta$=constant there, at step 102, then the bit of information could be encoded over that particular region. This could be done by identifying the regions allocated to the bits, at step 104, partitioning the region $R_n$ allocated to bit $b_n$ into two disjoint subregions $R_{n,1}$ and $R_{n,2}$ at step 106, and encoding $b_n$ at step 108 in the following way:

$W(u,v)=1+\epsilon \quad (u,v) \in R_{n,1}$ if $b_n=0$ $W(u,v)=1-\epsilon \quad (u,v) \in R_{n,2}$ $W(u,v)=1+\epsilon \quad (u,v) \in R_{n,1}$ if $b_n=1$ $W(u,v)=1-\epsilon \quad (u,v) \in R_{n,2}$ In this case, the recovery of the bit $b_n$ from the "spectral" observations provided by the degraded $\tilde{I}^W(u,v)$ over $R_n$ will involve straightforwardly deciding whether $$\beta\hat{\alpha}(R_{n,1}) \begin{array}{c}+ \\ > \\ < \\ -\end{array} \beta\hat{\alpha}(R_{n,2})$$

Denoting $q_i$ as the values of $\tilde{I}_w(u,v)$ and $s_i$ as the values of $\tilde{I}(u,v)$ where i indexes (u,v), let $N_j$ denote the indices associated to $R_{n,j}$, j=1,2 respectively. Additionally, assume that $q_i=\beta\alpha s_i+n_i$ where $n_i$ are i.i.d. complex Gaussians and $\alpha\in\{1-\epsilon, 1+\epsilon\}$. Calculating likelihood ratios, the optimal decision rule when P is known is given by $$\sum_{i \in N_1} \text{Re}(q_i^* s_i)\beta \sum_{i \in N_1} |s_i|^2 \begin{array}{c}b_n 1 \\ > \\ < \\ b_n 0\end{array} \sum_{i \in N_2} \text{Re}(q_i^* s_i)\beta \sum_{i \in N_2} |s_i|^2 \quad \text{Equation 15}$$

Note that in the case $\Sigma_{i \in N1}|si|^2=\Sigma_{i \in N2}|si|^2$, this reduces to $$\frac{\sum_{i \in N_1} \text{Re}(q_i^* s_i)}{\sum_{i \in N_1} |s_i|^2} \begin{array}{c}b_n=1 \\ > \\ < \\ b_n=0\end{array} \frac{\sum_{i \in N_2} \text{Re}(q_i^* s_i)}{\sum_{i \in N_2} |s_i|^2} \quad \text{Equation 16}$$

so that $\beta$ need not, in fact, be known. In this case it is optimal to form estimates as described above, one each for $R_{n,1}$ and $R_{n,2}$, at step 110, and then to take the comparative difference, at step 112. If $R_{n,1}$ and $R_{n,2}$ are chosen contiguous and of equal area, then it can be expected that $\Sigma_{i\in N1}|s_i|^2 \propto \Sigma_{i\in N2}|s_i|^2$.

Since it is desirable that the watermark survive cropping, the areas $R_{n,1}$ and $R_{n,2}$ shall not be too small. Thus, $\tilde{A}(u,v)$ may not be sufficiently close to a constant. Fortunately, the "differential encoding" procedure presented above can be generalized.

Figure 8:
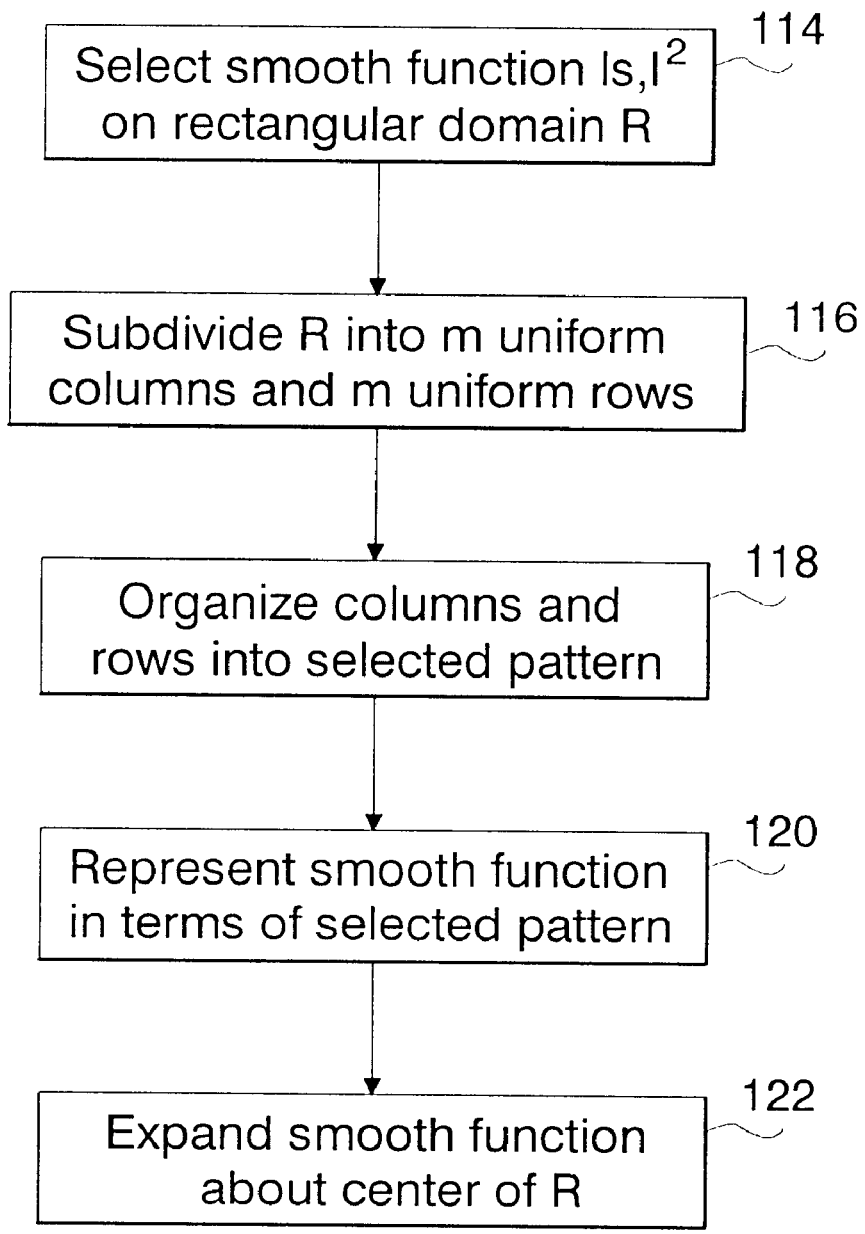

Referring now to FIG. 8, a generalized procedure for differential encoding may be carried out according to the following steps. One may consider and select, at step 114, for example, a smooth function f supported on a rectangular domain R. Suppose R is subdivided into m uniform columns and n uniform rows, at step 116, where nm is even, creating a grid. Next, assume that the grid is colored in a black-and-white checkerboard pattern, at step 118. Then Let $f_w$ denote the average of f over the white squares and let $f_b$ denote the average of f over the black squares, at step 120. As m and n tend to infinity, $f_w$ and $f_b$ both tend to $f_R$, the average of f over R. In particular, $(1+\epsilon)f_w - (1-\epsilon)f_b$ tends to $2\epsilon f_R$. More specifically, if f is expanded in a Taylor series about the center of R, at step 122, and m=n=2, then $f_w - f_b$ depends only on terms of order greater than or equal to 2.

One may consider the decision rule given by equation 16 and write $q_i = \beta_i s_i$ where $\beta_i$ discretizes in the plane $\tilde{A}(u,v)$ and assume that $N_1$ and $N_2$ are given by a 2×2 checkerboard as described above. Assume that $|S_i|^2$ is a discretized smooth function S in the plane and consider the center of the checkerboard to be the origin. It follows that the sums $\Sigma_{i\in N1}|S_i|^2, \Sigma_{i\in N2}|S_i|^2$, are both equal to the 0th order term of S plus other terms depending only on terms of order of at least 2. Assuming that $|S_i|^2$ can be modeled as S plus zero-mean i.i.d. noise, then the sums above have an additional random component with a variance inversely proportional to $|N_1|$ and $|N_2|$, respectively.

Assuming that $\Sigma_{i\in N1}|S_i|^2 = \Sigma_{i\in N2}|S_i|^2$, then the decision rule amounts to comparing two sums. If it is assumed that $A(u,v)$ and S are smooth, then the sums are equal up to second order terms. Even without assuming that $\Sigma_{i\in N1}|S_i|^2 = \Sigma_{i\in N2}|S_i|^2$, it follows that the difference of the sums depends only on terms of the order of at least 2.

Other variations on the decision rule are possible. For example, β may be estimated as $$\frac{1}{2} * \frac{\sum_{i\in N_i} \text{Re}(q_i^* s_i)}{\sum_{i\in N_i} |s_i|^2} + \frac{1}{2} * \frac{\sum_{i\in N_2} \text{Re}(q_i^* s_i)}{\sum_{i\in N_2} |s_i|^2}$$

and then substituted into equation 15. In our experiments, the resulting rule gave the same bit errors as those obtained using equation 16.

Referring to FIGS. 9 through 13, the watermarking and watermark recovery methods described above were extensively tested on a set of three 512×512 grey level 8-bit images, chosen from an art library database. The images comprise cropped grey level versions of paintings by Renoir (FIG. 9(a)), Michelangelo (FIG. 9(b)) and Botticelli (FIG. 9(c)). The multiplicative process discussed above comprised the method chosen for watermark embedding. As disclosed in the method, the magnitude of the 512×512 fourier transform of these images was multiplied by a mask function M(u,v|B) dependent on a vector B of 120 binary digits $\{b_{m,n} \in \{+1,-1\}, m=1,2\ldots,8, n=1,2,\ldots,15\}$. The geometry of the mask was chosen to be a very simple one. If one regards the frequency domain corresponding to the 512×512 images as $[-1,1]\times[-1,1]$ and introduces polar coordinates $(r,\theta)$ then $R_{m,n}$, the region reserved for embedding bit $b_{m,n}$, is defined by $$R_{m,n} = \left[(r,\theta): r \in \left[(m-1)\frac{1}{15}, m\frac{1}{15}\right], \theta \in \left[(n-1)\frac{\pi}{8}, n\frac{\pi}{8}\right]\right]$$

Figure 9A:
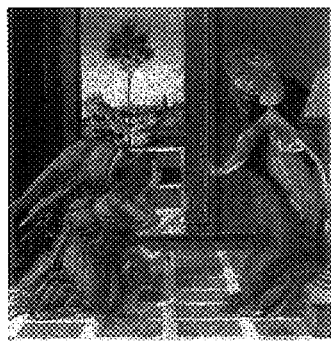
FIGS. 9(a)–9(i) illustrate original images and corresponding watermarked images and watermarks.
Figure 9B:
Figure 9C:

Recall that the M(u,v|B) must satisfy the symmetry property M(u,v|B)=M(−u,−v|B) so that each region $R_{m,n}$ is also duplicated by reflection about the origin. Each region $R_{m,n}$ rectangular in polar coordinates, was then subdivided into a 2×2 rectangular array for differential encoding, as described above in step 116 (FIG. 8). FIGS. 9(g) through 9(i) illustrate examples of M(u,v|B).

Figure 9D:
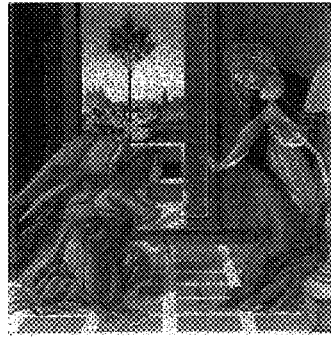
Figure 9E:
Figure 9F:
Figure 9G:
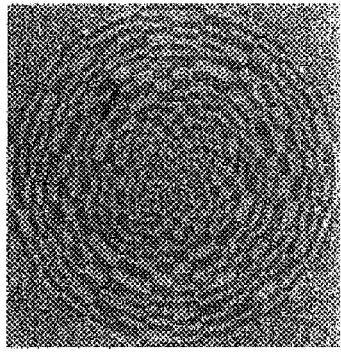
Figure 9H:
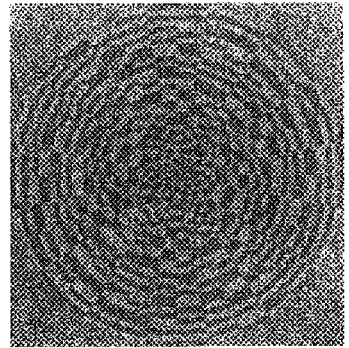
Figure 9I:
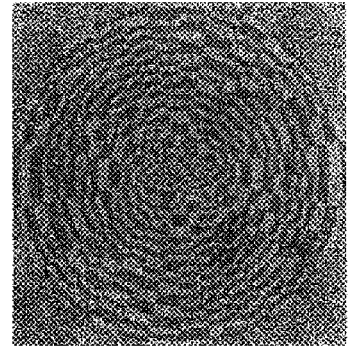
Figure 10A:
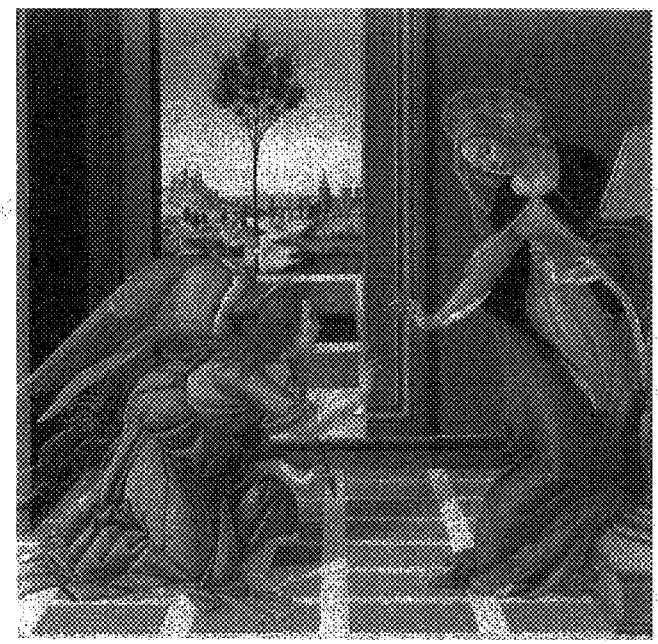
FIGS. 10(a)–10(d) illustrate image data results for a Botticelli digital image watermarked at various intensities.
Figure 10B:
Figure 10C:
Figure 10D:
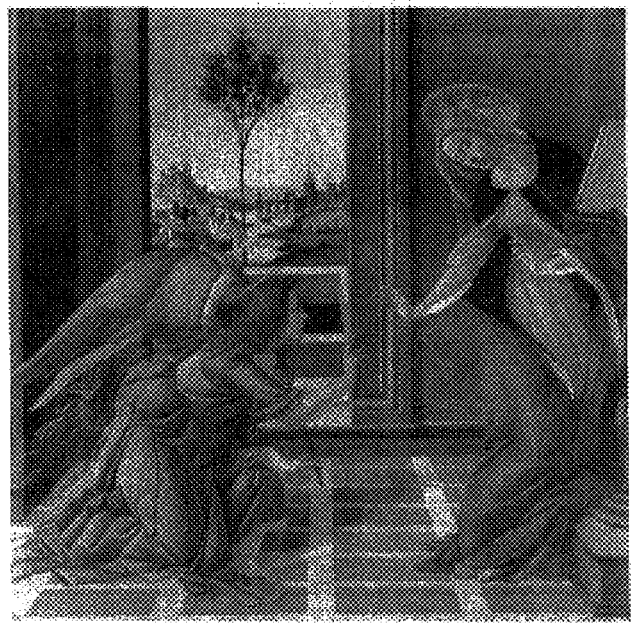
Figure 11A:
FIGS. 11(a)–11(d) illustrates image data results for a Michelangelo digital image watermarked at various intensities.
Figure 11B:
Figure 11C:
Figure 11D:
Figure 12A:
FIGS. 12(a)–12(d) illustrates image data results for a Renoir digital image watermarked at various intensities.
Figure 12B:
Figure 12C:
Figure 12D:
Figure 13A:
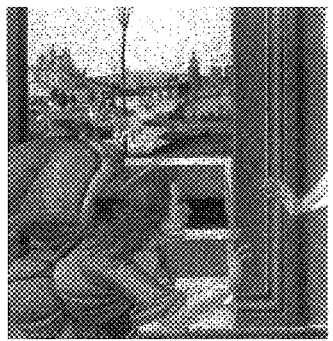
FIGS. 13(a)–13(i) show respective cropped portions of the watermarked images of FIGS. 10–12, the corresponding average value watermarks, and the respective error locations for the watermarks.
Figure 13B:
Figure 13C:
Figure 13D:
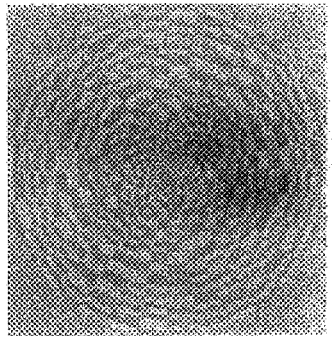
Figure 13E:
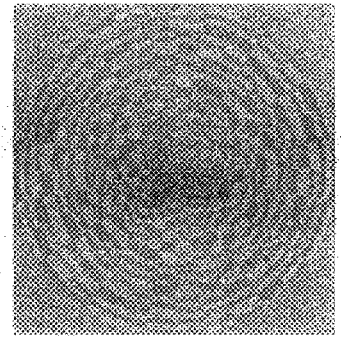
Figure 13F:
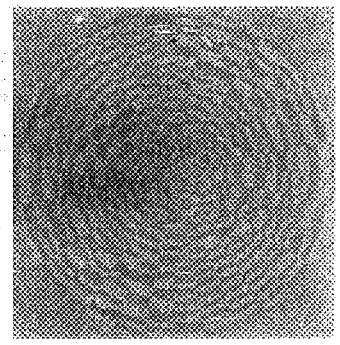
Figure 13G:
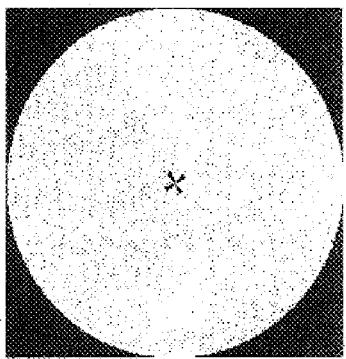
Figure 13H:
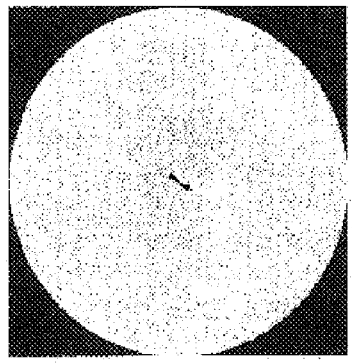
Figure 13I:
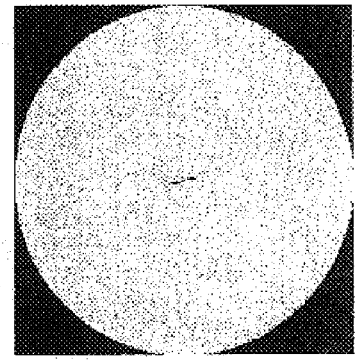
Figure 14A:
FIGS. 14(a)–14(d) illustrate watermarked images after a 20% quality JPEG compression.
Figure 14B:
Figure 14C:
Figure 14D:
Figure 15A:
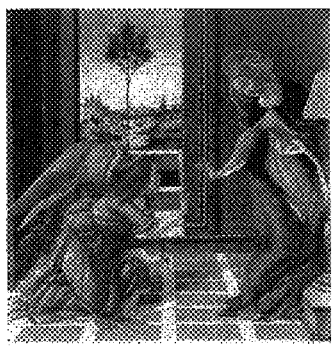
FIGS. 15(a)–15(i) show results for images after a 20% quality JPEG compression and the respective recovered watermarks and corresponding error locations.
Figure 15B:
Figure 15C:
Figure 15D:
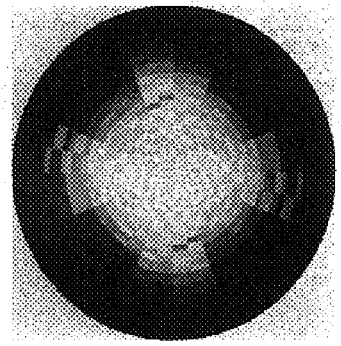
Figure 15E:
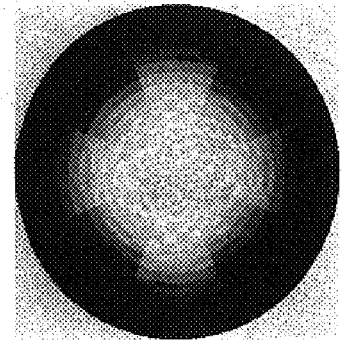
Figure 15F:
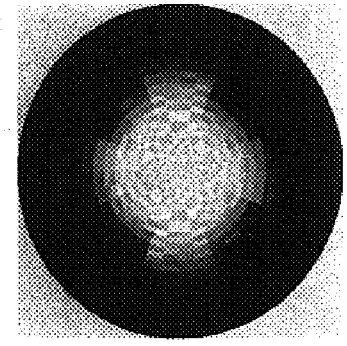
Figure 15G:
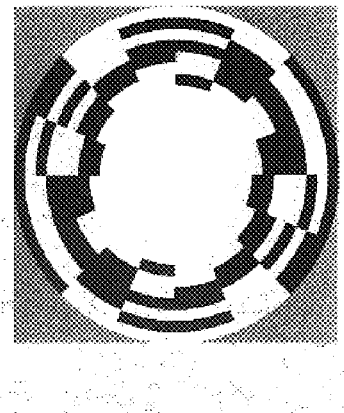
Figure 15H:
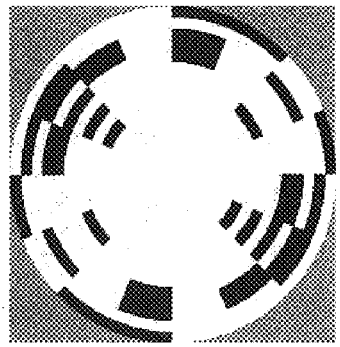
Figure 15I:
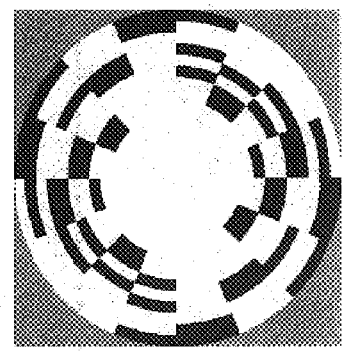
Figure 16A:
FIGS. 16(a)–16(i) illustrate results for printed/scanned and cropped images.
Figure 16B:
Figure 16C:
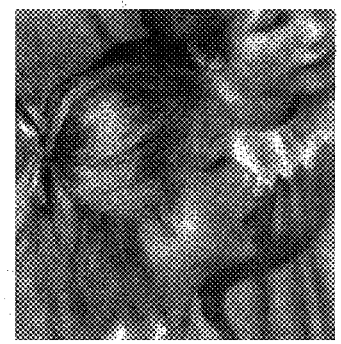
Figure 16D:
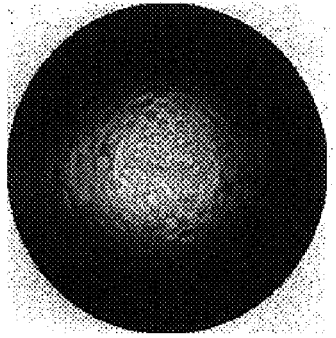
Figure 16E:
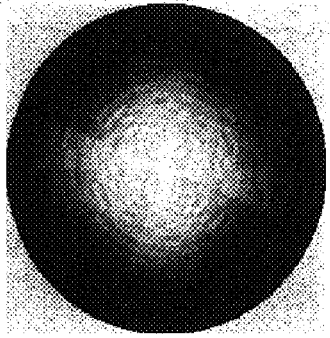
Figure 16F:
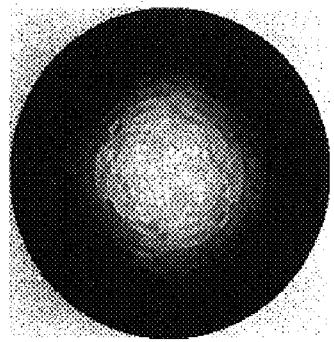
Figure 16G:
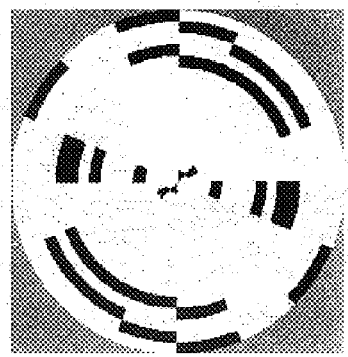
Figure 16H:
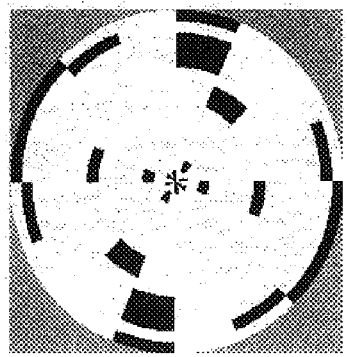
Figure 16I:
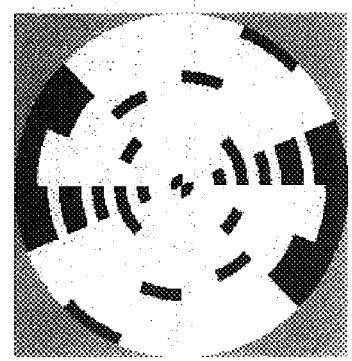
Figure 17A:
FIGS. 17(a)–17(i) show results for printed/scanned images.
Figure 17B:
Figure 17C:
Figure 17D:
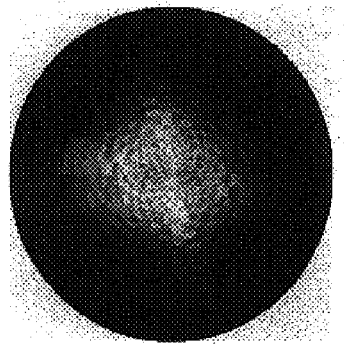
Figure 17E:
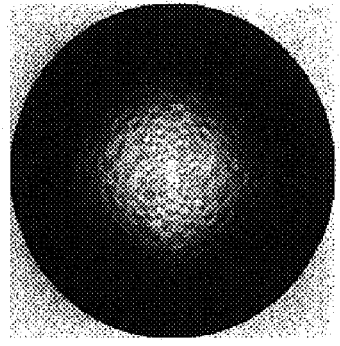
Figure 17F:
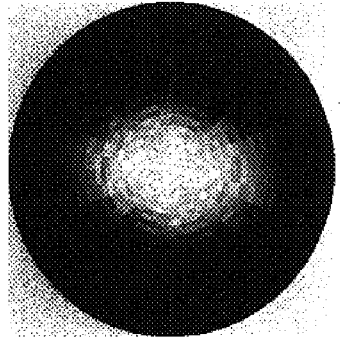
Figure 17G:
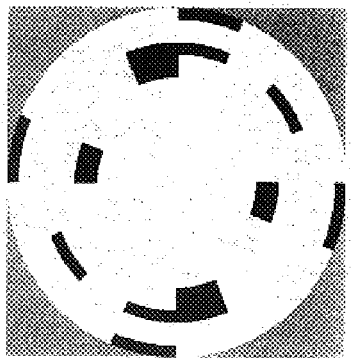
Figure 17H:
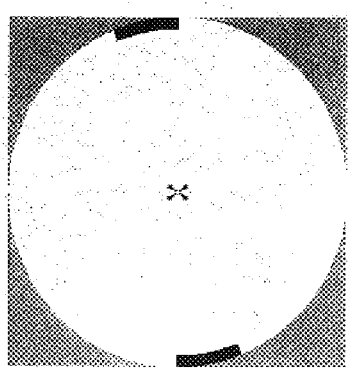
Figure 17I:
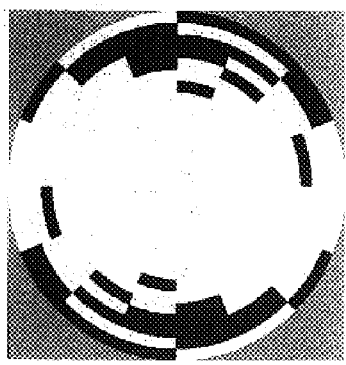
Figure 18A:
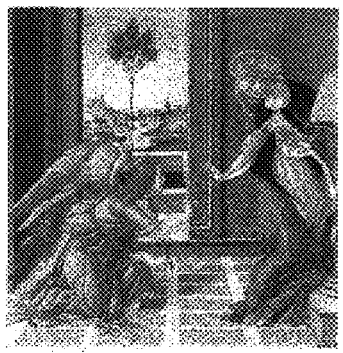
FIGS. 18(a)–18(i) illustrate results for Gamma adjusted images.
Figure 18B:
Figure 18C:
Figure 18D:
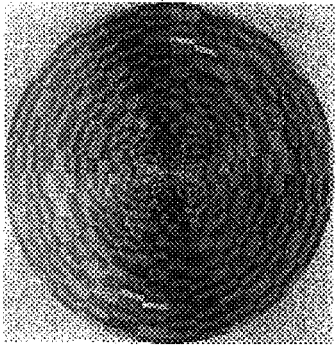
Figure 18E:
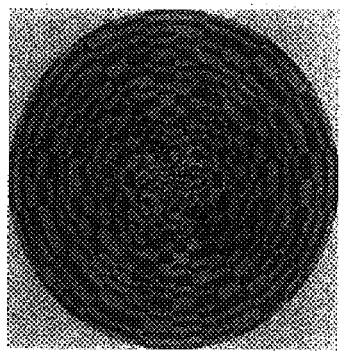
Figure 18F:
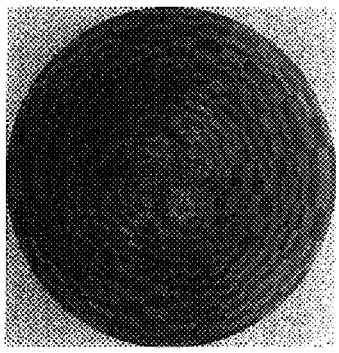
Figure 18G:
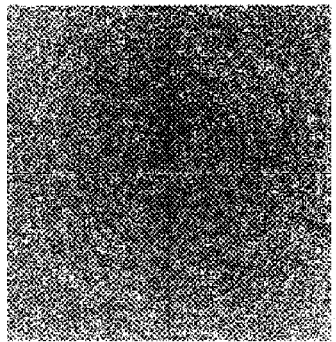
Figure 18H:
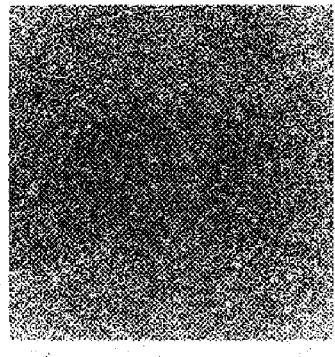
Figure 18I:
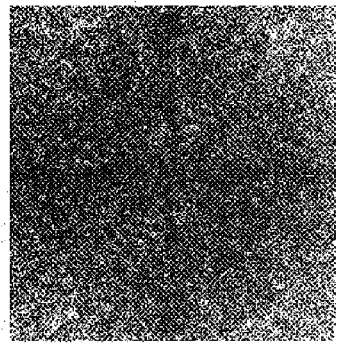

The watermarked version of each test image I(x,y), requantized by rounding and clipping, and shown in FIGS. 9(d)–9(f), was defined to be $$I^W(x,y) = FT^{-1}[1+\epsilon M(u,v|B)I(u,v)]$$

FIGS. 10, 11 and 12 show, respectively, the Botticelli, the Michelangelo and the Renoir test images watermarked with an arbitrary B vector, and various gain factors $\epsilon$=0.0, 0.05, 0.1, 0.2. We can see that for $\epsilon$=0.05, the value chosen for the subsequent tests, and $\epsilon$=0.01, the watermarked images are virtually indistinguishable from their original. FIGS. 9(a) through 9(i) show watermarked versions of each of the three test images with pseudo-random watermark information bit sequences B and $\epsilon$=0.05. The ideal local watermark recovery is not perfect due to the requantization of the watermarked images. However, 120 bits of data are perfectly recovered by the optimal watermark estimation procedure in spite of this.

After these initial tests addressing the effects of requantization alone on the watermark recovery, several others were performed in order to see how the 120 bits of watermark data would be affected by various degradations of the watermarked images. As already noted herein, the various degradations and modifications that affect the watermark include:

1. cropping portions of the image;
2. lossy compression-decompression cycles (with the standard JPEG algorithm);
3. changes in contrast;
4. printing on standard laser printers and rescanning the image (with possible cropping).

In order to test for watermark survival after printing-cropping-rescanning degradation, it is necessary to solve the rather delicate problem of registering the rescanned and possibly cropped image with the original. Recall that the watermark detection mechanism assumes the availability of two images or image portions in perfect registration.

Let f represent an image which may be a degraded sub-image of a watermarked image whose original may be denoted by g. Let Ω denote the rectangle over which f is defined. One may register f, using a multi-resolution hill climbing algorithm, by finding an affine transformation ψ which minimizes the following function $$\int_\Omega \frac{g(\Psi(x)) - \bar{g}}{\|g(\Psi(x)) - \bar{g}\|} * \frac{f(x) - \bar{f}}{\|f(x) - \bar{f}\|}$$

where $\bar{g} := \int_\Omega g(\psi(x))dx$ $\bar{f} := \int_\Omega f(x)dx.$

Once the desired ψ is found, the image may be resampled appropriately.

We performed several cropping tests on the three images shown in FIGS. 9(a)–(c), with cropped portions of respective 256×256 sizes. Typically, the bits were recovered with about 6 percent errors. FIGS. 13(a)–(i) show the watermark recovery results. Here, perfect alignment/registration was assumed with the original. The few detected errors resided in the low frequency components. This is undoubtedly due to the relatively small area reserved for bits embedded into these components.

With respect to images subjected to JPEG compression, the watermarked images were taken ($\epsilon$=0.05) and compressed using a standard JPEG algorithm with a quality factor of 20 percent. As seen in FIGS. 14(a)–(d) and 15(a)–(i), considerable visible degradations and blocking effects occurred in the images.

In all three images, the first (i.e., corresponding to low frequency) 55 bits of the watermark string B were recovered correctly and at least 90 of the 120 bits were correctly recovered. With higher quality factors the results would be better. As seen in the spectral image of the watermark recovery, the high frequencies are, not surprisingly, strongly affected by compression. Hence, the bits embedded in this range of the spectrum should not be expected to survive. Noticeably important, however, is the finding that due to the "differential" encoding of each bit, the low-range encoded information remains intact in spite of the fact that the compression process effectively scales the spectrum with a varying gain envelope. This is apparent by referring to FIGS. 15(a)–(i).

The cycle of degradations involving printing and cropping followed by image rescanning was the most severe test applied to the watermarks. First, the watermarked originals were printed on a 600 dpi laser printer, then scanned with a typical color image scanner at a resolution of 150 dpi. The above described general purpose multi-resolution image registration procedure for generating an optimally registered 512×512 image for each of the three rescanned images shown in FIG. 8 was implemented. Also generated were 256×256 optimally registered sections of the images, from three arbitrarily cropped portions of the rescanned originals. On these six redigitized images, the optimal watermark recovery algorithm was performed. The results are shown in FIGS. 16(a)–(i) and 17(a)-(i). In this case, 105 bits were recovered correctly out of the 120 that were embedded into the watermarked images. The results apply to uncropped images and 95 bits when using the optimally registered, redigitized cropped image sections one quarter in area. From these experimental results, it may be concluded that even under such severe degradations, one may expect to recover 90 bits out of the 120. Practically, this mostly involves the bits embedded into the lower frequency range.

With respect to images undergoing contrast changes, the image contrast was adjusted in a non-linear way. This was performed by adjusting the intensity value using a Gamma value of 2. The results are shown in FIGS. 18(a)–(i). The point-wise ratio exhibits apparently random noise while the overall brightening of the image reduces contrast and hence the energy in much of the spectrum. Because of the "differential" encoding, all of the bits in each image were nonetheless recovered correctly.

From our experiments, one of the important conclusions we arrived at included using the lower part of the frequency spectrum for watermarking without the vicinity of the DC component.

In our experiments we chose, rather arbitrarily, to encode the information in 120 sections in the entire spectral domain, with approximately equal energy under the assumption that the spectrum decayed as 1/r in amplitude from the center. This rather arbitrary choice is capable of customization and optimization, and we could have decided to use a lower section of the spectral domain. Moreover, we could have selected fewer bits to encode and made sure that all regions chosen have exactly the same energy.

Our experiments also confirmed the feasibility of using differential encoding of the bits. Various nonlinear degradations may be modeled by a rather smooth multiplicative mask in the frequency domain. The differential encoding method handles such degradations well. This method, too, can be refined and adapted to more specific information, assuming information availability, on the various degradations following compression-decompression cycles, printing and rescanning etc.

Additionally, the experiments support the use of error-correction for the bits strings embedded as watermarks.

With the arbitrary choice of embedding 120 bits in the entire frequency domain corresponding to the 512×512 images, we can typically recover the bits with less than 25 errors. This shows that an error correcting code could safely enable us to embed about 60 error-free information bits into the images we experimented with. This is more than enough for practical purposes.

There arises in this context the following issue: how can the recovered watermark bits be used to guarantee the identity associated with the image. If we can recover 60 error-free bits with a high probability, then 20–30 bits should be sufficient to encode the identity. We can then guarantee that all valid 60 bit watermarks are well separated in Hamming distance so that if the recovered 60 bits are valid, then the probability that those are the correct 60 bits uniquely identifying the source and recipient of the image will be very high. This probability value attached to the recovered watermark could be further refined by using soft decoding, for example.

Those skilled in the art will appreciate the many benefits and advantages afforded by the present invention. Significantly, watermarks embedded by the system and method of the present invention are imperceptible and have the ability to carry predetermined information. Moreover, the watermarks are distinguishable from one or more differently tagged copies of the image and are easily recoverable from a tagged image and the original image.

As a desirable security feature, attempts to remove the watermarks have noticeable ill-effects on the image. Additionally, image modification and compression algorithms have a relatively minor effect on the tags. Also important is the image cropping survival capability realized through distribution of the watermark in the image plane.

While the invention has been particularly shown and described with reference to the preferred embodiments thereof, it will be understood by those skilled in the art that various changes in form and detail may be made therein without departing from the spirit and scope of the invention.

What is claimed is:

1. A method of robust digital image watermarking for embedding a predetermined bit sequence into a digital image, said digital image comprising spatial domain data signals, said method including the steps of:

transforming said digital image into frequency domain data signals including respective magnitude and phase data signal components;

determining a set of contiguous regions in the frequency domain; and embedding said predetermined bit sequence directly into said image frequency domain data signals by mapping bits to well-defined regions in the frequency domain.

2. A method of robust digital image watermarking for embedding a predetermined bit sequence into a digital image, said digital image comprising spatial domain data signals, said method including the steps of:

transforming said digital image into frequency domain data signals including respective magnitude and phase data signal components;

determining a set of contiguous regions in the frequency domain; and embedding said predetermined bit sequence directly into said image frequency domain data signals by redundantly mapping bits to geometrically well-defined regions in the frequency domain.

3. A method according to claim 2 wherein said embedding step comprises:

representing each of said bits as a small variation of the frequency representation of said image over said contiguous region.

4. A method according to claim 2 wherein said embedding step comprises:

modulating said frequency domain data signals differentially over a contiguous region of the frequency domain according to said predetermined bit sequence.

5. A method according to claim 4 wherein said modulating step includes:

determining a checkerboard-like shaped pattern with said geometrically well-defined regions for said differential modulation comprising $1+/-\epsilon$ where $\epsilon$ comprises a modulation of relatively small magnitude; and applying said pattern to the frequency representation of said image.

6. A method according to claim 5 wherein said applying step comprises:

multiplying said image data signals by said pattern.

7. A method according to claim 2 wherein said embedding step includes:

determining geometric watermark mask signals; and assigning respective bits to respective regions within said frequency domain based upon geometrically masked signals.

8. A method according to claim 7 wherein said determining step includes:

creating a watermark capable of carrying watermark information.

9. A method of watermarking a digitized image for subsequent authentication, said digitized image comprising spatial domain data signals and being reproduced from an original image, said method including the steps of:

transforming said spatial domain data signals into frequency domain data signals including respective magnitude and phase data signal components;

embedding information signals into said magnitude data signals to develop modified data signals by redundantly mapping bits to geometrically well-defined regions in the frequency domain; and converting said modified data signals from said frequency domain to said spatial domain to generate said watermarked digitized image.

10. A method of watermarking according to claim 9 wherein said step of embedding includes:

multiplying said magnitude data signals by watermark mask signals.

11. A method of watermarking according to claim 9 wherein said step of embedding includes:

adding watermark mask data signals to said magnitude data signals.

12. A method of watermarking according to claim 9 wherein said information signals comprise small changes to predetermined areas of said magnitude data to maintain visual imperceptibility of said watermark.

13. A method of watermarking according to claim 9 wherein said step of embedding includes:

placing said information signals into low frequency regions of said frequency domain to maintain watermark survival following image modifications.

14. A method of watermarking according to claim 9 wherein said step of embedding includes:

compensating for expected image modifications to maintain watermark survivability.

15. A watermarking apparatus for tagging a digitized image for subsequent authentication, said digitized image comprising spatial domain data signals and being reproduced from an original image, said apparatus including:

a transformer, said transformer operating to transform said spatial domain data signals into frequency domain data signals including respective magnitude and phase data signal components, by redundantly mapping bits to geometrically well-defined regions in the frequency domain;

a processor disposed to receive the output of said transformer, said processor being operative to embed information signals into said magnitude data signals to develop modified data signals; and a converter located to receive the output of said processor, said converter operative to convert said modified data signals from said frequency domain to said spatial domain to generate said watermarked digitized image.

16. A watermarking apparatus according to claim 15 wherein said processor includes a multiplier.

17. A watermarking apparatus according to claim 15 wherein said processor includes an adder.

18. A method of recovering a watermark from a tagged digitized image comprising a reproduction of an original digitized image, said tagged digitized image and said original digitized image both comprising spatial domain dataset signals, said method including the steps of:

transforming said spatial domain data set signals comprising said respective original and tagged image signals into respective frequency domain dataset signals by redundantly mapping bits to geometrically well-defined regions in the frequency domain; and comparing said respective frequency domain dataset signals to identify said watermark and verify the authenticity of said image reproduction.

19. A method of recovering a watermark according to claim 18 wherein said comparing step includes:

taking the ratios of various local averages or functions of said respective dataset signals.

20. A method of recovering a watermark according to claim 18 wherein said comparing step includes:

taking the difference between said respective frequency domain dataset signals to identify said watermark.

21. A method of recovering a watermark according to claim 18 wherein said comparing step includes:

estimating a filter factor.

22. A method of recovering a watermark according to claim 18 wherein said transforming step includes:

taking the fourier transform of said respective spatial dataset signals.

23. A method of recovering a watermark according to claim 21 wherein said step of determining a filter factor includes:

reserving a selected portion of said frequency domain;

forming an estimate of said filter factor; and extrapolating said estimate over said frequency domain.

24. A method of recovering a watermark according to claim 21 wherein said determining step includes:

identifying contiguous regions in said frequency domain; and decoding embedded watermark information signals over said identified region.

25. A method of watermarking a digitized image for subsequent authentication, said digitized image comprising spatial domain data signals and being reproduced from an original image, said method including the steps of:

transforming said spatial domain data signals into frequency domain data signals including respective magnitude and phase data signal components;

embedding information signals into said magnitude data signals to develop modified data signals; and converting said modified data signals from said frequency domain to said spatial domain to generate said watermarked digitized image.

26. A watermarking apparatus for tagging a digitized image for subsequent authentication, said digitized image comprising spatial domain data signals and being reproduced from an original image, said apparatus including:

a transformer, said transformer operating to transform said spatial domain data signals into frequency domain data signals, including respective magnitude and phase data signal components;

a processor disposed to receive the output of said transformer, said processor being operative to embed information signals into said magnitude data signals to develop modified data signals; and a converter located to receive the output of said processor, said converter operative to convert said modified data signals from said frequency domain to said spatial domain to generate said watermarked digitized image.

27. A method of recovering a watermark from a tagged digitized image comprising a reproduction of an original digitized image, said tagged digitized image and said original digitized image both comprising spatial domain dataset signals, said method including the steps of:

transforming said spatial domain data set signals comprising said respective original and tagged image signals into respective frequency domain dataset signals; and comparing said respective frequency domain dataset signals to identify said watermark and verify the authenticity of said image reproduction.

28. A watermark recovery apparatus for authenticating a tagged digitized image comprising a reproduction of an original image, said respective images comprising spatial domain dataset signals, said apparatus including:

a transformer, said transformer operative to transform said spatial domain data signals comprising said respective images into respective frequency domain dataset signals; and a comparator, said comparator being responsive to said transformer to compare said respective frequency domain dataset signals to identify said watermark and verify the authenticity of said image reproduction.

29. A digitized image authentication system for implanting and detecting watermark information in a digitized reproduction of an image, said digitized image comprising spatial domain data signals and being reproduced from an original image, said system including:

a watermarking apparatus for tagging said digitized image signals, said apparatus including:

a transformer located to receive said spatial domain data signals, said transformer operative to transform said spatial domain data signals into frequency domain data signals including respective magnitude and phase data signal components;

a processor disposed at the output of said transformer, said processor being operative to embed information into said magnitude data signals to develop modified data signals;

a converter positioned to receive the output of said processor, said converter being operative to convert said modified data signals from said frequency domain to said spatial domain to generate said watermarked digitized image signals; and a watermark recovery apparatus for authenticating said tagged digitized image, said recovery apparatus including:

a transformer located to receive said spatial domain data signals comprising said respective images, said transformer being operative to transform said spatial domain data signals into respective frequency domain dataset signals; and a comparator receiving said respective frequency dataset signals from said transformer, said comparator being operative to compare said respective frequency domain dataset signals to identify said watermark and verify the authenticity of said image reproduction.

30. A watermark recovery apparatus for authenticating a tagged digitized image comprising a reproduction of an original image, said respective images comprising spatial domain dataset signals, said apparatus including:

a transformer, said transformer operative to transform said spatial domain data signals comprising said respective images into respective frequency domain dataset signals by redundantly mapping bits to geometrically well-defined regions in the frequency domain; and a comparator, said comparator being responsive to said transformer to compare said respective frequency domain dataset signals to identify said watermark and verify the authenticity of said image reproduction.

31. A digitized image authentication system for implanting and detecting watermark information in a digitized reproduction of an image, said digitized image comprising spatial domain data signals and being reproduced from an original image, said system including:

a watermarking apparatus for tagging said digitized image signals, said apparatus including a transformer located to receive said spatial domain data signals, said transformer operative to transform said spatial domain data signals into frequency domain data signals including respective magnitude and phase data signal components;

a processor disposed at the output of said transformer, said processor being operative to embed information into said magnitude data signals to develop modified data signals by redundantly mapping bits to geometrically well-defined regions in the frequency domain;

a converter positioned to receive the output of said processor, said converter being operative to convert said modified data signals from said frequency domain to said spatial domain to generate said watermarked digitized image signals; and a watermark recovery apparatus for authenticating said tagged digitized image, said recovery apparatus including:
- a transformer located to receive said spatial domain data signals comprising said respective images, said transformer being operative to transform said spatial domain data signals into respective frequency domain dataset signals; and
- a comparator receiving said respective frequency dataset signals from said transformer, said comparator being operative to compare said respective frequency domain dataset signals to identify said watermark and verify the authenticity of said image reproduction.

32. A method according to claim 4, wherein the modulating step includes:

placing said bits of the predetermined bit sequence into lower frequencies of said frequency domain comprising of a sequence of concentric rings located between radii $r_i$ and $r_{1+i}$.

33. A method according to claim 32, wherein said bits, $b_1, b_2 \ldots, b_N$, of the predetermined bit sequence are placed into lower frequencies of said sequence of concentric rings in accordance with the following formula:

$$W_M(u,v) = 1 + \epsilon(-1)^{b_i} \text{ for } \sqrt{u^2+v^2} \epsilon [r_i, r_{i+1}).$$

34. A method according to claim 2, wherein said predetermined bit sequence is absent from a DC component of said digital image.

* * * * *